US012630066B2

(12) United States Patent
Shin et al.

(10) Patent No.: US 12,630,066 B2
(45) Date of Patent: May 19, 2026

(54) OVERLOAD PROTECTION SYSTEM

(71) Applicant: VOLVO CONSTRUCTION EQUIPMENT AB, Eskilstuna (SE)

(72) Inventors: Yang Shin, Kronoberg (SE); Adrian Chrzanowski, Bielany (PL)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 368 days.

(21) Appl. No.: 18/243,301

(22) Filed: Sep. 7, 2023

(65) Prior Publication Data

US 2024/0116423 A1 Apr. 11, 2024

(30) Foreign Application Priority Data

Oct. 10, 2022 (EP) ..................................... 22200672

(51) Int. Cl.
*B60P 1/00* (2006.01)
*B60P 1/28* (2006.01)

(52) U.S. Cl.
CPC .................................... *B60P 1/283* (2013.01)

(58) Field of Classification Search
CPC .... B60P 1/04; B60P 1/26; B60P 1/267; B60P 1/28; B60P 1/283
USPC ......................................................... 298/1 R
See application file for complete search history.

(56) References Cited

U.S. PATENT DOCUMENTS

| | | | | |
|---|---|---|---|---|
| 3,751,112 A | * | 8/1973 | Hagenbuch | ............... B60P 1/26 |
| | | | | 296/50 |
| 5,174,632 A | * | 12/1992 | Hagenbuch | ............. B60P 1/267 |
| | | | | 296/183.2 |
| 5,887,914 A | * | 3/1999 | Hagenbuch | ............. B60P 1/267 |
| | | | | 296/183.2 |
| 6,471,299 B2 | * | 10/2002 | Brooks, Jr. | ............. B60P 1/283 |
| | | | | 298/17 B |
| 6,726,288 B2 | | 4/2004 | Hagenbuch | |
| 2021/0188146 A1 | | 6/2021 | Lock et al. | |

FOREIGN PATENT DOCUMENTS

| | | |
|---|---|---|
| AU | 506231 B2 | 12/1979 |
| CN | 108791014 A | 11/2018 |
| KR | 100987538 B1 | 10/2010 |
| WO | 2022084951 A1 | 4/2022 |

OTHER PUBLICATIONS

Extended European Search Report, European Patent Application No. 22200672.8, mailed Mar. 16, 2023, 6 pages.

* cited by examiner

*Primary Examiner* — Steven O Douglas
(74) *Attorney, Agent, or Firm* — Sage Patent Group

(57) ABSTRACT

A tailgate overload protection system for a dump truck is disclosed. The tailgate overload protection system comprises a wire and a safety fastener. The wire is configured to interconnect a rear frame and a tailgate arm of the dump truck. The rear frame is connected to the wire via the safety fastener. The safety fastener is configured to break first when a tailgate of the dump truck is overloaded.

14 Claims, 6 Drawing Sheets

100

OVERLOAD PROTECTION SYSTEM

CROSS REFERENCE TO RELATED APPLICATIONS

This application claims priority to European Patent Application No. 22200672.8, filed on Oct. 10, 2022, the disclosure and content of which is incorporated by reference herein in its entirety.

TECHNICAL FIELD

The disclosure relates generally to an overload protection system. In particular aspects, the disclosure relates to a tailgate overload protection system. The disclosure can be applied in heavy-duty vehicles, such as trucks, buses, and construction equipment. Although the disclosure may be described with respect to a particular vehicle, the disclosure is not restricted to any particular vehicle.

BACKGROUND

Vehicles having dumper bodies are used for the transport of heavy loads. The vehicle may be loaded with different materials/items having different density. Therefore, loaded vehicle may sometimes be overloaded with loads having high density while personnel responsible for loading the vehicle is not aware of such overload.

Typically, dumper bodies do not have overload protection and it is normally one of load carry structure parts that is damaged in cases of overloading. Repairing or delivering new spare part is expensive and time consuming and in these cases, typically the entire dump body may need to go through a repair, as the damaged structure part cannot easily be replaced on-site.

Therefore, there is a need for an overload protection system which would provide simple, quick, and cheap repairs of a dumper body.

SUMMARY

According to a first aspect of the disclosure, a tailgate overload protection system for a dump truck is disclosed. The tailgate overload protection system comprises a wire and a safety fastener. The wire is configured to interconnect a rear frame of the dump truck and a tailgate arm of the dump truck. The rear frame is connected to the wire via the safety fastener. The safety fastener is configured to break first when a tailgate of the dump truck is overloaded.

The first aspect of the disclosure may seek to provide a system that may protect load-carry structure parts of the dump truck from being damaged in situations when the truck is overload. A technical benefit may include protection of the dumper body, in particular, the load-carry structure parts of the dump truck in cases of overload resulting in the system that is easy to repair and thus reducing down-time of the entire dumper truck. Also, by providing the overload protection system in accordance to the present disclosure is advantageous as the system is simple, versatile, convenient, and easy to implement.

The tailgate overload protection system may be configured to protect the dump truck, in particular the dumper body and its load-carry structure parts in cases when the dumper body is overloaded. In particular, the protection system may be configured to protect the dumper body in overload cases when the dumper body is arranged to dump any load arranged therein.

In the present context, the dump truck may be understood as a vehicle configured to carry and transport loads and further configured to dump the load by discharging it. The dump truck may comprise the rear frame, a dumper body closed with the tailgate, the tailgate comprising the tailgate arm. The dump truck may be an articulated hauler.

The wire may be a non-metal wire, a metal wire, or a wire that combines metals and non-metals. The wire may be required to withstand shear forces. The wire may be a steel rod or cable. The wire may be flexible. The wire may be configured to bend. The wire, arranged in the overload protection system may form a straight line in cases when the tailgate operates, i.e. when it is open. Further, the wire may be tensioned when the tailgate is open. The wire may ensure that the distance between tailgate arm and the safety fastener arranged on the rear frame is constant, when tailgate operates, i.e. when open. The wire may be a chain. The wire may have a larger load capacity than the safety fastener. The wire may be configured to secure the distance between the tailgate and the rear frame. The wire may have wear life longer than this of the safety pin. The wire may comprise a material that forms protection against environmental conditions.

The wire is configured to interconnect the rear frame and the tailgate arm of the dump truck. The wire may be tensioned between the rear frame and the tailgate arm. The rear frame may form part of a rear section of the dump truck. The dumper body may be arranged on the rear frame. The dumper body may pivot with respect to the rear frame to allow the load loaded in the dumper body to be emptied. The rear frame is sometimes referred as a truck chassis. As mentioned above, the dumper body may comprise a tailgate interconnected with other parts of the dumper body via the tailgate arm. The tailgate is configured to open and allow the load loaded in the dumper body to be emptied. When the dumper body is pivoted about the chassis, the tailgate may also be pivoted about the body of the dumper body. In this scenario, the load may press the tailgate and if the dumper body was overloaded the tailgate will be overloaded as well and the protections system may ensure that the tailgate and the dumper body are not damaged. The tailgate may be a wire-operated tailgate. The tailgate may be an overhung wire-operated tailgate.

The safety fastener may be a cylindrical element. The safety fastener may mechanically join or affix the rear frame and the tailgate together. The safety fasteners may be used to create a non-permanent joint between the rear frame and the tailgate. In other words, the safety fastener may be removed, dismantled, or broken without damaging the joining components. The safety fastener may be made of steel. The steel safety fastener may be made of stainless steel, carbon steel, or alloy steel.

The safety fastener is configured to interconnect the rear frame and the tailgate via the wire. Both the wires and the rear frame may portions configured to receive the safety fastener to thereby ensure the link between there between. The safety fastener is configured to be the first element that breaks when the dump truck, i.e. the dumper body, is overloaded. The safety fastener may be configured as the weakest link in between the chassis and the tailgate. In other words, if the dumper body is overloaded, the safety fastener may be damaged before any other element forming the rear section (including the rear frame and the dumper body). In this way, any damage of the of the load carry structure.

In some examples, the safety fastener may be configured to break when a predetermined force is applied thereto via the wire. The safety fastener may be configured to withstand around 55-70% of the full load that the other parts of the dumper body can withstand. The predetermined force may be defined in comparison with a maximum load that the dumper body can withstand. Alternatively, the predetermined force may be defined with respect to the maximum load that the tailgate can withstand. For instance, if the tailgate and/or the load-carry structure parts of the dumper body are designed to withstand 10 tones static load, the safety fastener may be designed to withstand 5.5-7 tones loads. In this case, expected loads in normal operation of the dump truck may be around 4-5 tones. The overload protection system, and in particular the safety fastener is therefore designed to protect the load-carry structure parts which are expensive and complex to repair, as well as time consuming for from a service point of view. Therefore, to protect load carry structure parts, the use of a simple system, and in particular, the use of a standard simple part such as a safety fastener having low price and good availability for customers may be advantageous as it may be simple and easy to exchange the safety fastener.

In some examples, the predetermined force may be lower than the lowest load capacity of any segment of the rear section of the dump truck. Different elements of the rear section, including the tailgate, tailgate arm, load-carry structure parts of the dumper body, chassis, etc. may be designed to have different load capacity. By having the predetermined force that the safety fastener can withstand being lower than any load capacity of any other segment of the rear section it is ensured that it is the safety fastener may break first and thereby protect all the segments of the rear section from breaking. The load capacity may be defined as the maximum static load that an element can withstand before getting damaged.

In some examples, the safety fastener may be configured to break when a predetermined shear force is applied thereto. The sear force may act on the safety fastener as the wire may be pulling the fastener in one direction while the rear frame may be pulling the fastener in another direction. The safety fastener may be positioned such that the shear force acting thereto is related to the load acting on the tailgate and the structure parts of the dumper body. The predetermined shear force that the safety fastener can withstand may be lower than any static load capacity of any other segment of the rear section. Thereby, it may be ensured that it is the safety fastener that breaks first and thereby protect all the segments of the rear section from breaking.

In some examples, the safety fastener may be configured to shear when the predetermined shear force is applied thereto, thereby disconnecting the rear frame from the wire. As the safety fastener interconnects the tailgate and the chassis, the safety fastener may be exposed to a strain produced by load acting on the tailgate. Thereby, the safety fastener may be strained such that its inner layers are laterally shifted in relation to each other causing a damage of the fastener. In this way, the other parts of the dumper body, and in particular the tailgate, tailgate arm, and the wire are protected from damaging.

In some examples, the tailgate may be overloaded when a ratio between a force exerted onto the tailgate and a shear strength of the safety fastener is in the range 1 to 1.6. The shear strength of the safety fastener may be understood as the maximum load that can be supported prior to fracture, when applied at a right angle to the fastener's axis. A load occurring in one transverse plane is known as single shear. Double shear is a load applied in two planes where the fastener could be cut into three pieces. The safety fastener may be selected and designed by taking into account the maximum load that can be exerted onto the tailgate before the tailgate gets damaged. In the worst case scenario, the fastener can be designed to withstand shear forces equal to the maximum tolerable load of the tailgate. The sear strength of the safety fastener (both single sear and double shear) may be lower than the maximum tolerable load exerted on the tailgate. In this way, the tailgate is protected from overloading.

In some examples, the safety fastener may be a slotted spring pin. In some examples, the safety fastener may be a safety pin. The safety fastener may be a safety spring pin. The safety fastener may be a coiled spring pin. The spring pin may be considered as a mechanical fastener that secures the relative position between the wire and rear frame and interconnects them to each other. The spring pin may have a body diameter which is larger than a diameter of a portion of the rear frame that connects to the wire. The spring action of the safety spring pin may allow it to compress as it assumes the diameter of the portion of the rear frame that connects to the wire. The force exerted by the safety pin against the portion of the rear frame that connects to the wire may ensure the link between the wire and the rear frame. Therefore, the safety spring pin may be considered a self-retaining fastener. The slotted spring pin may be in the form of a cylindrical pin rolled from a strip of material with a slot to allow the pin to have flexibility during insertion. Having the safety fastener in the form of a pin, spring pin, or a slotted spring pin is advantageous as such fastener is easily available and ensures easy and quick repairs thereby minimizing costs of the repair as well as down-time of the dump truck in case of overloading.

In some examples, the safety fastener may be a screw. The screw may be a standard screw element, i.e. a slender, possibly sharp-pointed pin with a raised helical thread running round it and a slotted head. The screw may also be to join the tailgate arm and chassis together. The screw may be made of metal. In some examples, the safety fastener may be a pin and in case of damage, it can be replaced by a screw, provided that the screw satisfies requirements on shear strength similar to those satisfied by the damaged pin. This adds to versatility and flexibility of the overload protection system.

In some examples, the rear frame may comprise a mount. The mount may be an integral part of the rear frame. Alternatively, the mount may be configured to be mounted to the rear frame of the dump truck. The wire may be configured to interconnect the rear frame and the tailgate arm of the dump truck via the mount. The mount may be connected to the wire via the safety fastener. The mount may form part of the tailgate overload protection system. The mount may be designed to fit different types of safety fasteners, as well as different types of wires, in particular in terms of thickness and/or diameter of the safety fastener and type and diameter of the wire. The mount may accommodate both the wire and the safety fastener on one end, while connecting to the rear frame on its other end.

In some examples, the mount may comprise a rigid arm for connection to the rear frame of the dump truck. The mount may further comprise a bracket located at or adjacent to an end of the rear frame. The mount may comprise a coupling profile for receiving the safety fastener therein. The rigid arm, the bracket, and the coupling profile may all together form an integral part. The rigid arm, the bracket, and the coupling profile may be configured to be mounted on the rear frame. The coupling profile may be designed to match the design of the safety coupler and the wire. Having the mount defining separate sections provides versatility in designing the mount as well as use of different types of wires and safety fasteners. Also, in cases when the mount is a separate part from the rear frame, it is possible to reuse standard design for the rear frame while only designing the mount, safety fastener, and the wire. The mount may be made of metal. The rigid arm, the bracket, and the coupling profile may also be made of metal. The rigid arm may be connected to the rear frame by welding, or by various fasteners, such as bolts and screws. The mount may have larger shear strength than the safety fastener. Each of the mount's elements may be configured to withstand larger loads than the safety fastener.

In some examples, the safety fastener may be configured to break at a predetermined force that is calculated based on a maximum loadbearing capacity of the rigid arm. The predetermined force may be lower than the maximum load-bearing capacity of the rigid arm. In this way it is ensured that the safety fastener, being the weakest link in the dumper body, will be damaged before the rigid arm is damaged. Thereby, the wire, and the tailgate, will disconnect from the rear frame. Loadbearing capacity is the maximum ability of a structural element, rigid arm in this case, to take loading before failure occurs.

In some examples, the mount may comprise two attaching plates. The safety fastener may be configured to fasten the two attaching plates to each other. The attaching plates may form part of the tailgate overload protection system. The attaching plates may be configured to be detachably attached to the rear frame. The attaching plates may simplify insertion, placement, and exchange of the safety fastener.

In some examples, the safety fastener may be configured as a rotation axis for the wire. The wire may have a loop portion at one end. The loop portion may be arranged around the safety fastener. Once the safety fastener breaks, the loop portion will slip from it and the tailgate will disengage from the rear frame. Having the safety fastener configured as a rotation axis for the wire ensures that the wire has some freedom for movements during opening of the tailgate while still ensuring that forces acting on the tailgate are transferred to the safety fastener via the wire.

In some examples, the wire may be a steel cable or cord. Steel ensures sufficient rigidity and strength required for the wire connecting the tailgate and the rear frame.

According to a second aspect of the disclosure, a dump truck comprising the tailgate overload protection system in accordance with the first aspect is disclosed. The second aspect of the disclosure may seek to provide a dump truck with which ensures simple and easy repairs in cases of overload. A technical benefit may include protection of the dump truck, specifically a dumper body, in particular, the load-carry structure parts of the dump truck in cases of overload resulting in the system that is easy to repair and thus reducing down-time of the entire dumper truck.

In some examples, the dump truck may further comprise a front section and a rear section. The front section is generally called a tractor. The rear section may comprise a dumper body and a rear frame. The dumper body may be arranged and carried by the rear frame. The dumper body may comprise a body, a tailgate and a tailgate arm. The body may be formed by load-carry structure elements. The tailgate may be configured to close the body. The overload protection system may be configured to control opening of the dumper body by operating the tailgate. If the overload protection system breaks, the tailgate may disengage from the rear frame.

In some examples, the tailgate is an overhung wire-operated tailgate. The overhung wire-operated tailgate may be lifted from the dumper body by controlling the wire tensioned between the tailgate and the rear frame.

According to a third aspect of the disclosure, a method for preventing damages on a dump truck is disclosed. The dump truck comprises a tailgate protection system comprising a wire configured to interconnect a rear frame and a tailgate arm of the dump truck. The rear frame is connected to the wire via a safety fastener. Said method comprises providing a tailgate threshold force, wherein a force exerted onto a tailgate connected to the tailgate arm above the tailgate threshold force constitutes a risk of damaging the tailgate or the tailgate arm. The method further comprises selecting the safety fastener such that this has a shear strength that provides for that the safety fastener breaks when the force above the tailgate threshold force is exerted onto the tailgate or the tailgate arm. By selecting the safety fastener based on the level of forces acting on the tailgate or the tailgate arm, the tailgate and the dumper body are protected in cases of overload. In other words, the shear strength of the safety fastener is selected to avoid damages of the tailgate.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Vehicles having dump bodies used for the transport of heavy loads may be overloaded while personnel responsible for loading the vehicle is not aware of such overload. Typically, dumper bodies do not have overload protection and it is normally one of load-carry structure parts of the dumper bodies that is damaged in cases of overloading. In these cases, the entire dumper body may need to go through a repair, as the damaged structure part cannot easily be replaced. The present disclose solves this problem by providing a tailgate overload protection system which ensures a simple, quick, and cheap repair of the dumper body in cases of overloading. The system of the present disclosure comprises a safety fastener configured to break when the dumper body is overloaded. By having the safety fastener breaking first in cases of overloading, other parts of the dumper body are protected. The safety fastener may be exchanged quickly what further reduces down-time of the dumper vehicle. Additionally, by having the safety fastener being a standard and easily available component, repair costs of the dumper body in cases of overloading are also reduced. The safety fastener may be replaceable. For instance, the safety fastener may be replaced with another fastener which may not be of the same type as the broken one, what provides versatility of the protection system.

Figure 1:
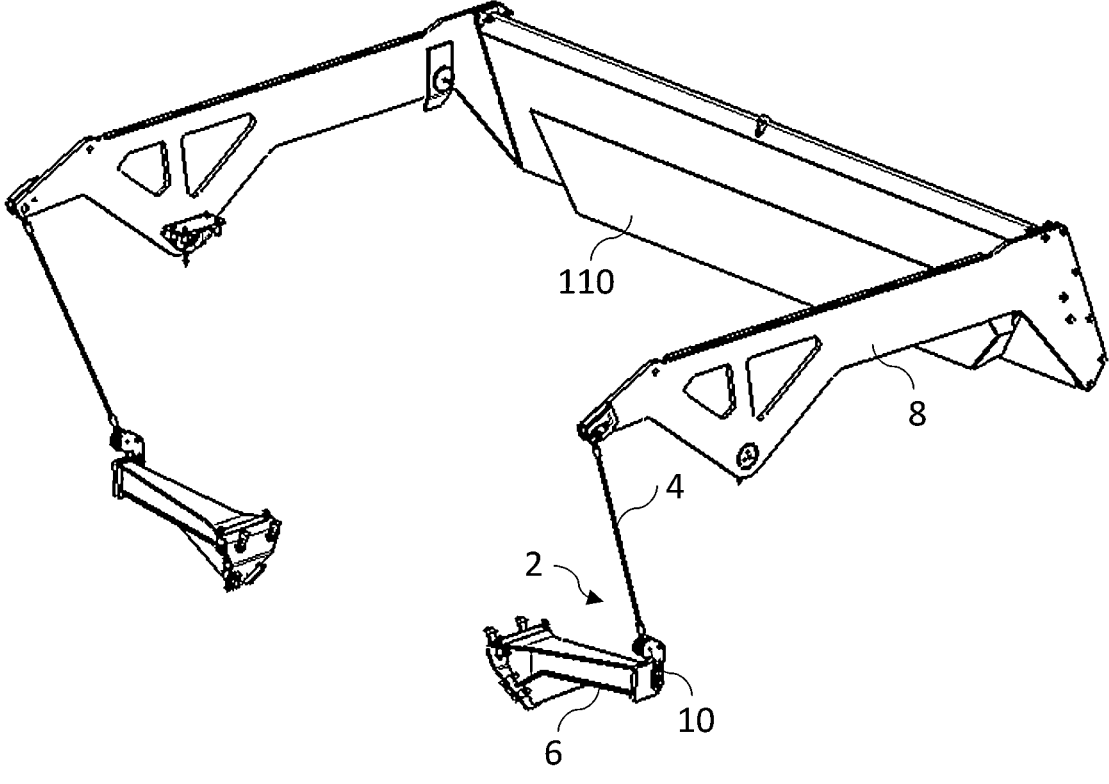
FIG. 1 is an exemplary tailgate overload protection system according to one example of the present disclosure.

FIG. 1 is an exemplary tailgate overload protection system 2 according to one example of the present disclosure. The tailgate overload protection system is suitable for use in a dump truck. The tailgate overload protection system 2 comprises a wire 4 and a safety fastener 10. The wire 4 is configured to interconnect a rear frame 6 (a portion of which is shown in FIG. 1) and a tailgate arm 8 of the dump truck. The rear frame 6 is connected to the wire 4 via the safety fastener 10. The safety fastener 10 is configured to break first when a tailgate 110 of the dump truck 100 is overloaded.

Figure 2:
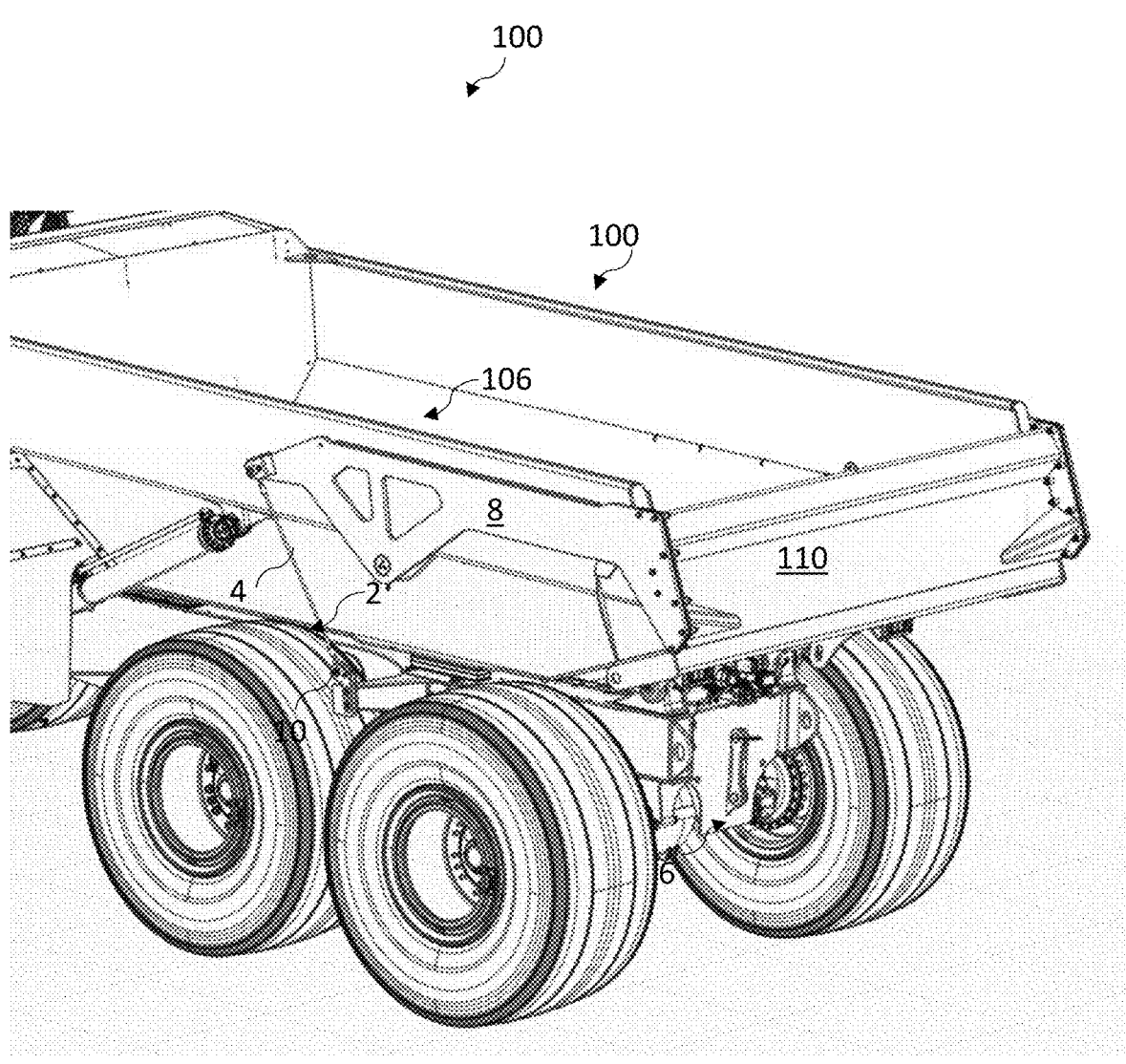
FIG. 2 is an exemplary tailgate overload protection system according to one example of the present disclosure.

FIG. 2 is an exemplary tailgate overload protection system 2 according to one example of the present disclosure. FIG. 2 shows where the tailgate overload protection system 2 is placed on a dump truck 100 (a portion of which is shown in FIG. 2). The dumper truck 100 has a dumper body 106. The dumper body 106 may be loaded with different types of loads. If the dumper body 106 is overloaded, at times when the dumper body is to be off-loaded, the load may act on the tailgate 110, and forces acting on the tailgate may be transferred to the wire 4, connecting the tailgate 110 with the rear frame 6. The safety fastener 10, being the weakest link in the rear section of the dump truck will deform and/or break first thereby protecting the tailgate and other parts of the dumper body 106 from damage.

Figure 3:
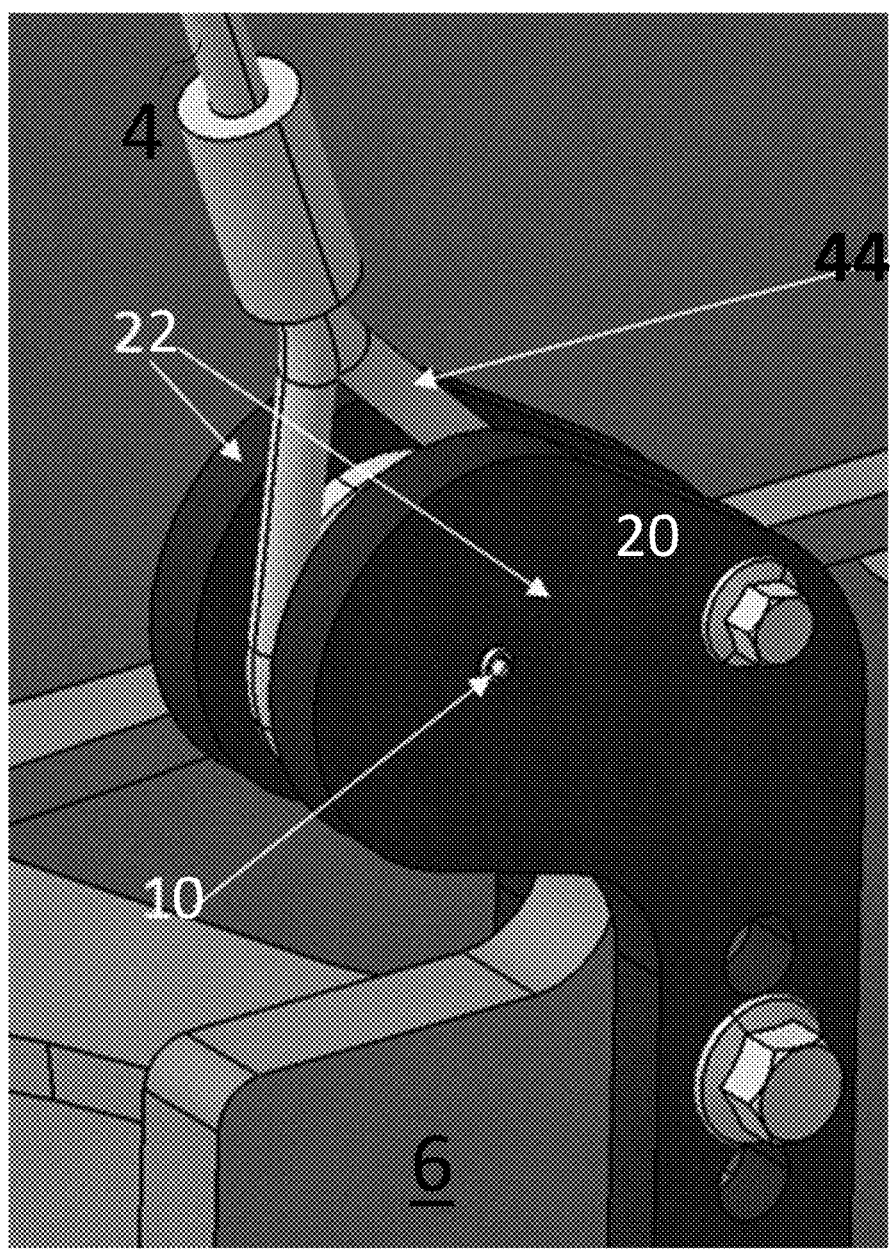
FIG. 3 is an exemplary illustration of tailgate overload protection system according to one example of the present disclosure.

FIG. 3 is an exemplary illustration of tailgate overload protection system according to one example of the present disclosure. In this example, the rear frame 6 comprises a mount 20. The mount 20 may be an integral part of the rear frame 6. Alternatively, the mount 20 may be configured to be mounted to the rear frame 6. The wire 4 may be configured to interconnect the rear frame 6 and the tailgate arm (not shown) of the dump truck via the mount 20. The mount 20 may be connected to the wire 4 via the safety fastener 10. The mount 20 may form part of the tailgate overload protection system. The mount 20 may be designed to fit different types of safety fasteners 10, such as pins and screws, as well as different types of wires 4, in particular in terms of thickness and/or diameter of the safety fastener 10 and type and diameter of the wire 4. The mount 20 may accommodate both the wire 4 and the safety fastener 10 on one end, while connecting to the rear frame 6 on its other end.

Figure 4:
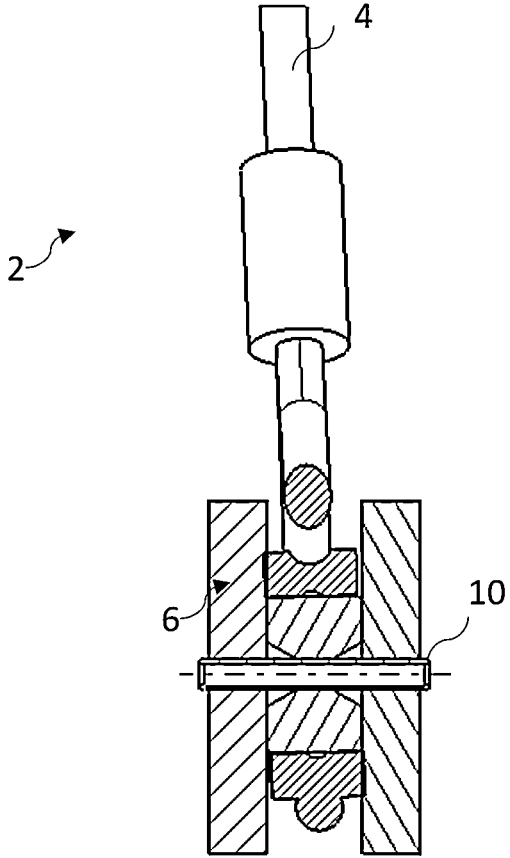
FIG. 4 is an exemplary tailgate overload protection system according to one example of the present disclosure.

FIG. 4 is an exemplary tailgate overload protection system 2 according to one example of the present disclosure. The tailgate overload protection system 2 comprises a wire 4 and a safety fastener 10. In this example, the safety fastener is a spring pin configured to interconnect the wire 4 and the rear frame 6. In another example, the safety fastener may be a screw. If the pin breaks, it may be exchanged with another spring pin, a standard pin, a slotted spring pin, or a suitable screw. The wire 4 may be a steel cord or steel cable.

Figure 5:
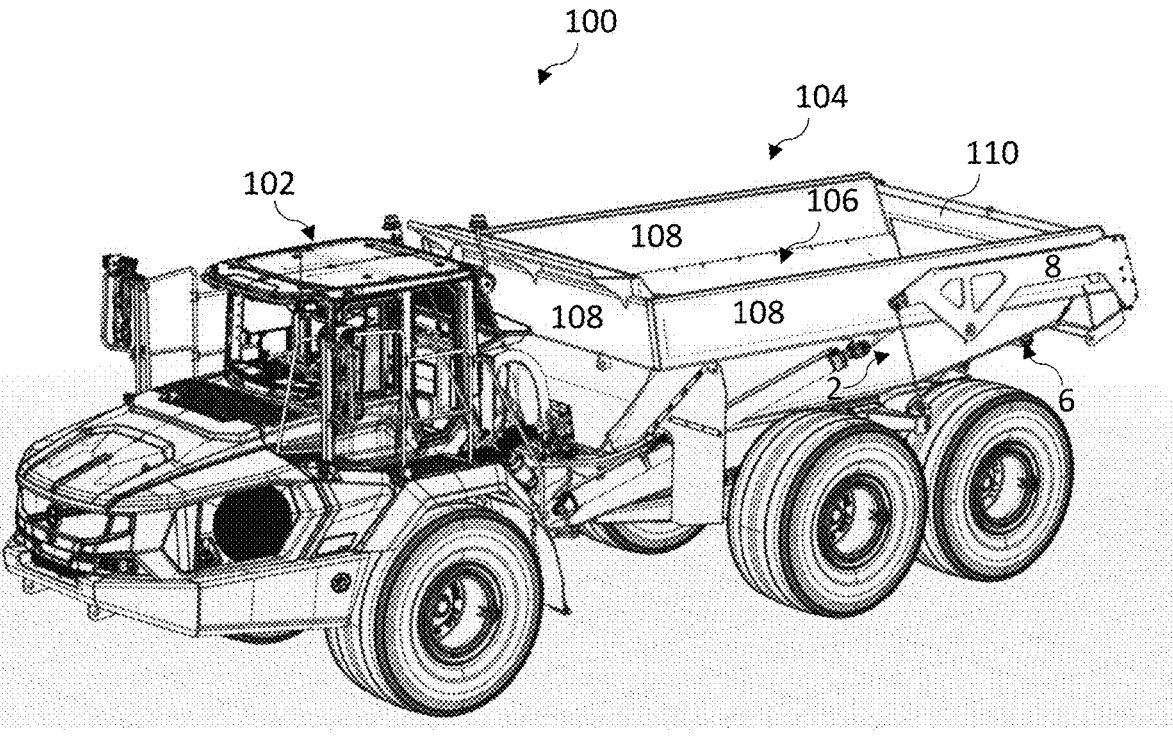
FIG. 5 is an exemplary dump truck according to one example of the present disclosure.

FIG. 5 is an exemplary dump truck 100 according to one example of the present disclosure. The dump truck 100 comprises the tailgate overload protection system 2. The tailgate overload protection system 2 may be as the one illustrated in FIG. 1. The dump truck 100 comprises a front section 102 and a rear section 104. The rear section 104 comprises a dumper body 106 and a rear frame 6. The dumper body 106 is defined by a body 108, a tailgate 110, and a tailgate arm 8. The tailgate 110 is configured to close the body 108. The overload protection system 2 is configured to control opening of the dumper body 106 by operating the tailgate 110. In the example illustrated in FIG. 5, the tailgate 110 is an overhung wire-operated tailgate. In this example, the mount 20 comprises two attaching plates 22. The safety fastener may be configured to fasten the two attaching plates 22 to each other. The attaching plates 22 may be configured to be detachably attached to the rear frame 6. In this example, the safety fastener 10 is configured as a rotation axis for the wire 4. The wire 4 may have a loop portion 44 at one end. The loop portion 44 may be arranged around the safety fastener 10. Once the safety fastener 10 breaks, the loop portion 44 will slip from it and the tailgate will disengage from the rear frame 6. Having the safety fastener configured as a rotation axis for the wire ensures that the wire has some freedom for movements during opening of the tailgate while still ensuring that forces acting on the tailgate are transferred to the safety fastener via the wire.

The dump truck 100 having dumper body 106 may be used for transportation of various loads, such as grass, snow, soil, sand, rocks, and similar. The dumper body may be pivotable relative to the rear frame 6 (truck chassis) to allow for loads contained in the dumper body 106 to be emptied. The dumper body may be pivotable about the rear frame via a hinge assembly that may be connected between the dumper body and the rear frame, i.e. the truck chassis. The hinge assembly is typically located at the rear of the dumper body and the chassis.

Figure 6:
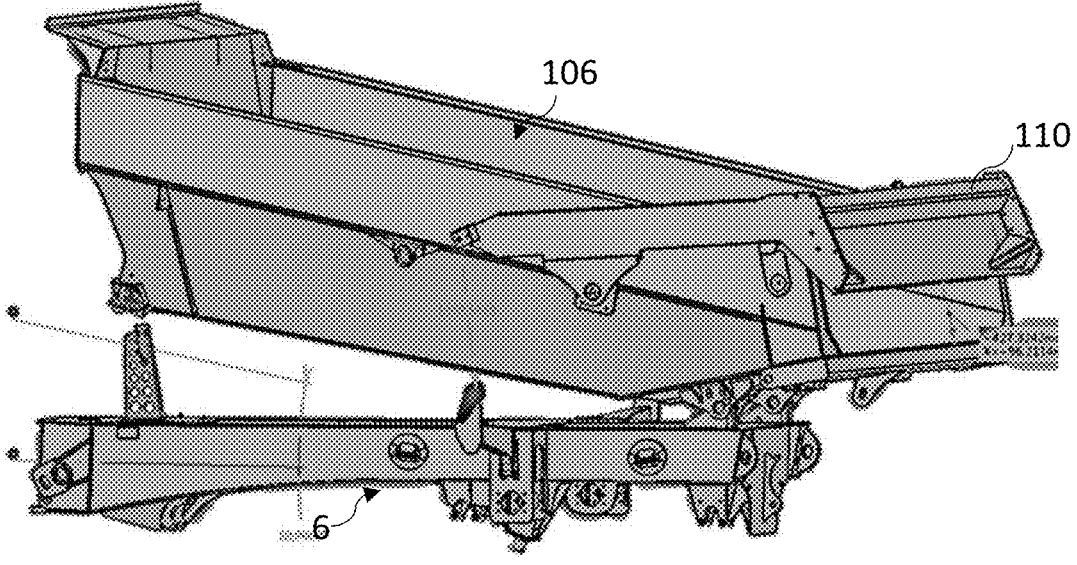
FIG. 6 is a schematic illustration of a rear section of dump truck according to one example of the present disclosure.

FIG. 6 is a schematic illustration of a rear section of dump truck according to one example of the present disclosure. In this example, the rear section comprises a rear frame 6, a dumper body 106 pivoted from the rear frame, and an overhung wire-operated tailgate 110. Overload situations may occur in these scenarios, i.e. when the dumper body is pivoted to unload loads and the tailgate is also at least at the beginning of lifting. If a load acting on the tailgate is larger than a predetermined load that a safety fastener can withstand, the fastener will break and the tailgate 110 will disengage from the rear frame. In this way the tailgate and the load-carry structure elements of the dumper body 106 are protected.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A tailgate overload protection system for a dump truck, the tailgate overload protection system comprising:
   a wire configured to interconnect a rear frame and a tailgate arm of the dump truck; and
   a safety fastener;
   wherein the rear frame is connected to the wire via the safety fastener, wherein the safety fastener is configured to break first when a tailgate of the dump truck is overloaded, and wherein the safety fastener is configured to break when a predetermined force is applied thereto via the wire and wherein the predetermined force is lower than the lowest load capacity of any segment of a rear section of the dump truck.

2. The tailgate overload protection system according to claim 1, wherein the safety fastener is configured to break when a predetermined shear force is applied thereto.

3. The tailgate overload protection system according to claim 2, wherein the safety fastener is configured to shear when the predetermined shear force is applied thereto, thereby disconnecting the rear frame from the wire.

4. The tailgate overload protection system according to claim 1, wherein the tailgate is overloaded when a ratio between a force exerted onto the tailgate and a shear strength of the safety fastener is in the range 1 to 1.6.

5. The tailgate overload protection system according to claim 1, wherein the safety fastener is a slotted spring pin or a screw.

6. The tailgate overload protection system according to claim 1, wherein the rear frame comprises a mount, and wherein the wire is configured to interconnect the rear frame and the tailgate arm of the dump truck via the mount, and wherein the mount is connected to the wire via the safety fastener.

7. The tailgate overload protection system according to claim 6, wherein the mount comprises a rigid arm for connection to the rear frame of the dump truck and a bracket located at or adjacent to an end thereof and comprising a coupling profile for receiving the safety fastener therein.

8. The tailgate overload protection system according to claim 6, wherein the mount comprises two attaching plates and wherein the safety fastener is configured to fasten the two attaching plates to each other.

9. The tailgate overload protection system according to claim 1, wherein the safety fastener is configured as a rotation axis for the wire.

10. The tailgate overload protection system according to claim 1, wherein the wire is a steel cable or cord.

11. A dump truck comprising the tailgate overload protection system according to claim 1.

12. The dump truck according to claim 11, further comprising a front section and a rear section, the rear section comprising a dumper body and a rear frame, the dumper body comprising a body, a tailgate and a tailgate arm, the tailgate being configured to close the body, and wherein the overload protection system is configured to control opening of the dumper body by operating the tailgate.

13. The dump truck according to claim 11, wherein the tailgate is an overhung wire-operated tailgate.

14. A method for preventing damages on a dump truck, wherein the dump truck comprises a tailgate protection system comprising a wire configured to interconnect a rear frame and a tailgate arm of the dump truck, wherein the rear frame is connected to the wire via a safety fastener, the method comprising:
   providing a tailgate threshold force, wherein a force exerted onto a tailgate connected to the tailgate arm above the tailgate threshold force constitutes a risk of damaging the tailgate or the tailgate arm; and
   selecting the safety fastener such that the safety fastener has a shear strength that provides for the safety fastener to break when the force above the tailgate threshold force is exerted onto the tailgate or the tailgate arm;
   wherein the safety fastener is configured to break when a predetermined force is applied thereto via the wire and wherein the predetermined force is lower than the lowest load capacity of any segment of a rear section of the dump truck.

* * * * *